(No Model.) 2 Sheets—Sheet 1.
G. H. REMINGTON.
BELT SHIFTER.
No. 421,515. Patented Feb. 18, 1890.
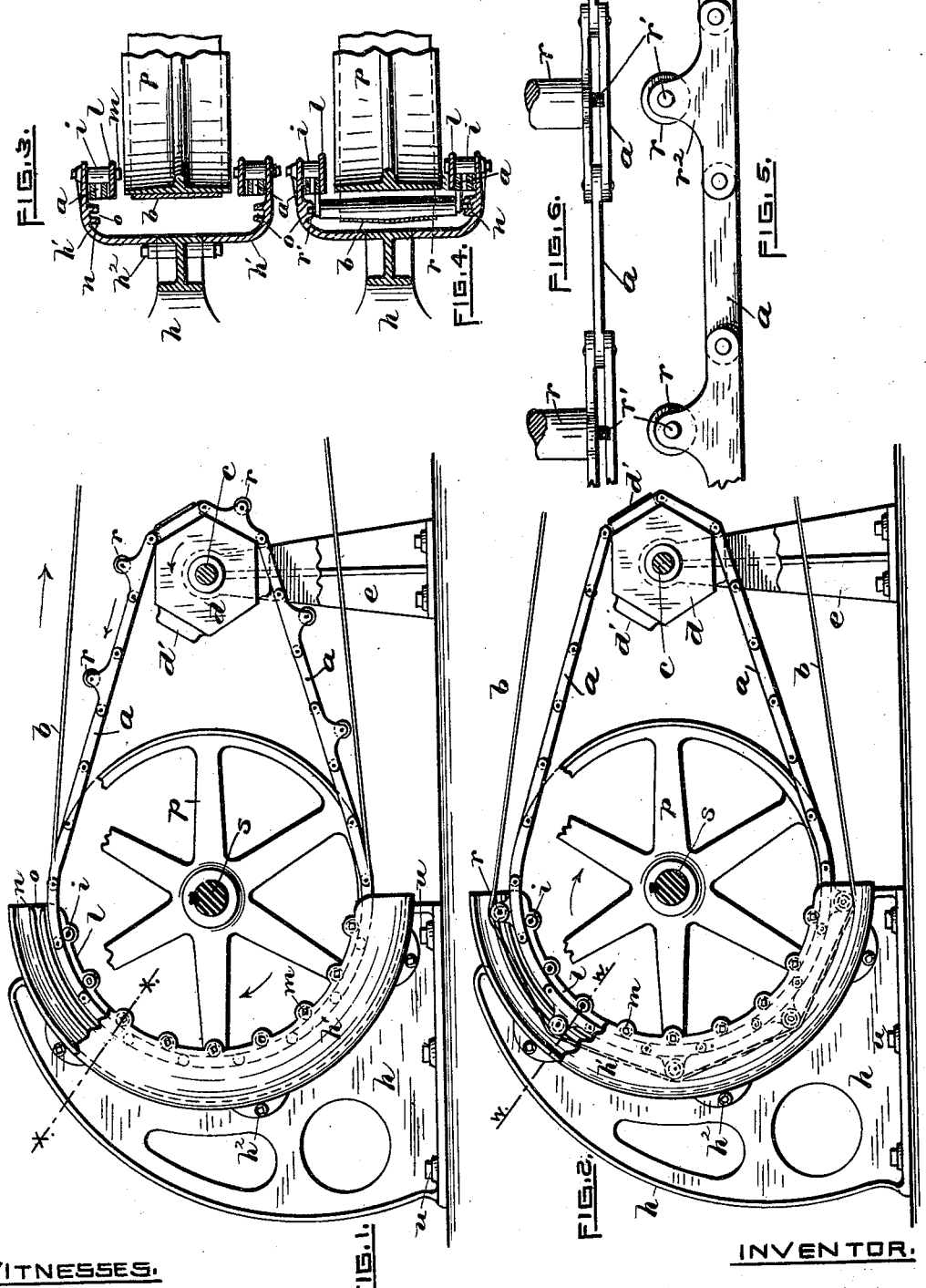
WITNESSES.
INVENTOR.
George H. Remington.

(No Model.) 2 Sheets—Sheet 2.
G. H. REMINGTON.
BELT SHIFTER.
No. 421,515. Patented Feb. 18, 1890.
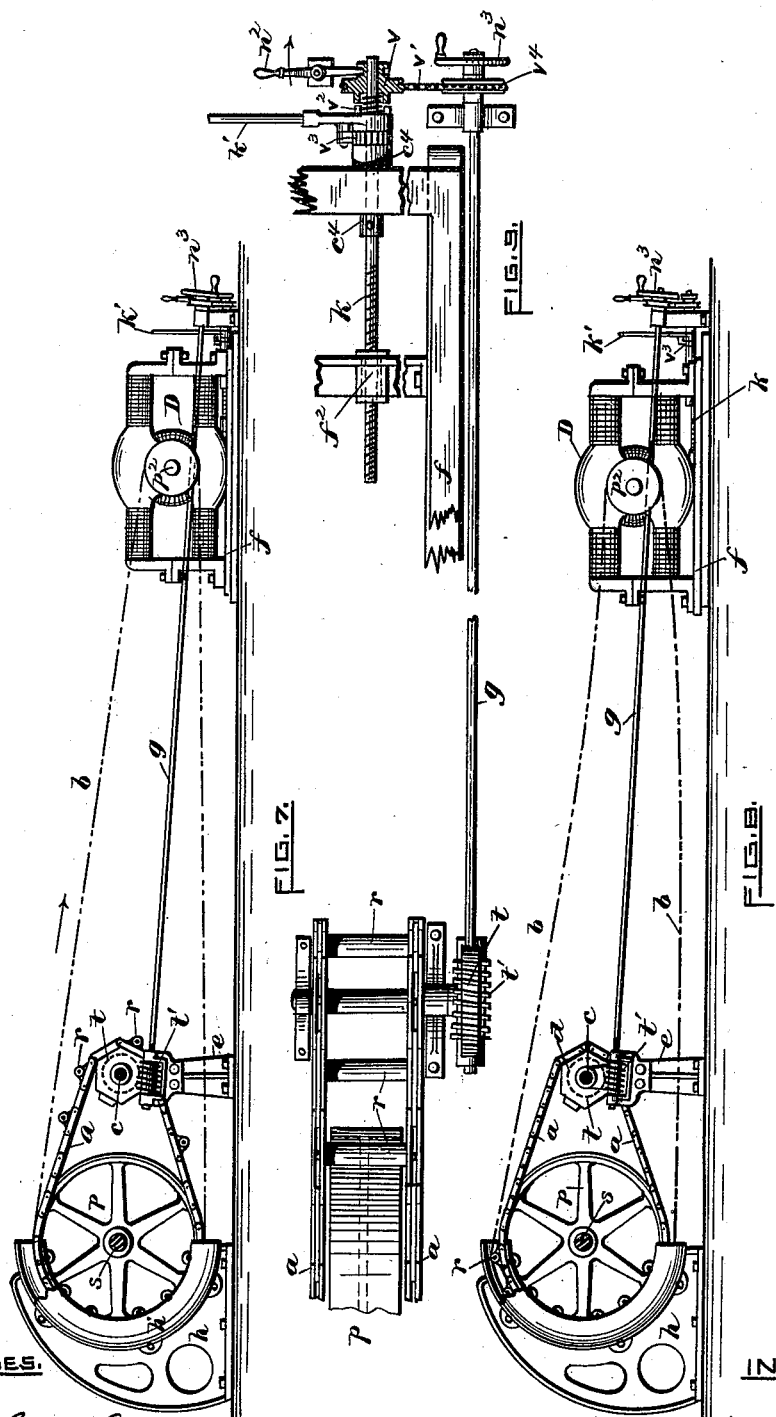
WITNESSES. INVENTOR.
Charles Hannigan George H. Remington
Hubert F. Foustellot by Remington & Hawthorn
Attys.

UNITED STATES PATENT OFFICE.

GEORGE H. REMINGTON, OF PROVIDENCE, RHODE ISLAND.

BELT-SHIFTER.

SPECIFICATION forming part of Letters Patent No. 421,515, dated February 18, 1890.

Application filed May 1, 1889. Serial No. 309,234. (No model.)

*To all whom it may concern:*

Be it known that I, GEORGE H. REMINGTON, a citizen of the United States, residing at Providence, in the county of Providence and State of Rhode Island, have invented certain new and useful Improvements in Belt-Shifters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention pertains to the class of inventions covering devices which have for their object the shifting of belts radially from driving-pulleys.

Devices for rendering endless belts stationary, except when employed for useful work, are numerous and well known. Among such may be mentioned the double pulley, one fast and the other loose on the shaft, the belt being shipped laterally from one pulley to the other, as desired. Another well-known device is the combination of a clutch and loose pulley, constituting what is known as a "clutch-pulley." Still another arrangement is sometimes used consisting of a fast pulley and a "binder-pulley" mounted in a movable frame or bearing and adapted to frictionally engage the driving-belt. Such device, while serving to slacken the belt when desired, does not in any manner act to entirely withdraw or disengage the belt from the revolving driving-pulley.

The object of my invention is to provide means whereby the driving-belt, after being slackened somewhat, may be readily lifted radially from the periphery of the revolving pulley, and, when required, as readily replaced upon it.

In certain kinds of machinery—as, for example, dynamos in which a belt of considerable size and weight is employed for driving it—the conditions and requirements are such usually that the machines are not operated continuously throughout the twenty-four hours of each day. Therefore it is of importance that means be provided for readily starting and stopping the dynamo. It is usual in quick-running machinery of this class to mount the dynamo on a sliding frame, and by means of a suitable "take-up" device the dynamo is susceptible of being carried nearer to the main driving-pulley, thereby slackening the belt and permitting it to be taken off; or when the dynamo is to be operated, as in the generation of electricity, the device is then actuated in the opposite direction to increase the distance between the dynamo and driving-pulley, thus securing the desired belt-tension. My present invention is readily adapted to be associated or combined with mechanism of this character; and it consists, essentially, of two suitably-mounted normally-stationary endless flexible aprons or chains, (one at each side of the pulley,) which for a portion of their lengths are united transversely at intervals by rolls, and mechanism for effecting a longitudinal movement of the apron when desired. By reason of my improved belt-shifter the belt as slackened is lifted gradually from the continuously-revolving pulley by means of the rolls, which extend above the general surface of the laterally-guided advancing chain. The portion of the chain provided with said rolls equals about one-half (more or less) of the circumference of the pulley. The driving-belt is replaced upon the pulley by simply reversing the movement of the chain; or it may be effected by continuing the movement of the chain in a forward direction until it again assumes the normal position.

In the accompanying two sheets of drawings, Figure 1, Sheet 1, is a side elevation of my improved belt-shifting mechanism in partial section in its normal position, the belt being in contact with its driving-pulley. Fig. 2 is a similar view showing the now stationary belt lifted from the pulley and supported by the rolls, which have been advanced for the purpose by means of a forward movement of the chains. Fig. 3 is a transverse sectional view taken on line $x\,x$ of Fig. 1. Fig. 4 is a similar view taken through line $w\,w$ of Fig. 2. Fig. 5 is a side view, enlarged, of a portion of one of the side chains of flexible apron. Fig. 6 is a top view. Fig. 7, Sheet 2, is a side elevation of a dynamo driven by a belt and provided with my improved belt-shifter, and also showing a device for regulating the tension of the belt, which at the same time actuates the belt-shifter. Fig. 8 is a similar view, the belt being shifted and stationary; and Fig. 9 is a partial plan view, enlarged, of the position and relation of the parts shown in Fig. 7, the dynamo, however, being omitted.

The following is a more detailed description of my invention, including the manner of its construction and operation. I would first state, however, that the main or driving shaft $s$, pulley $p$, rigidly secured thereto, and the driving-belt $b$ may be made, arranged, and mounted, as usual, the employment of my improved belt-shifter therewith not calling for any change whatever in their construction.

My invention resides largely in the use of a suitably-mounted flexible endless apron, consisting of two chains $a$, united at intervals by rolls $r$. In the drawings the chain is represented as composed of flat links jointed together in a well-known manner. Some of the links are provided with an extension $r^2$, projecting some distance above the general surface or edge of the chain, as clearly shown in Fig. 5. The rolls $r$, before referred to, are made somewhat "crowning" or tapering, (see Fig. 4,) and are provided at each end with a projecting journal or pin $r'$, which are mounted to revolve in the said extensions $r^2$. The same result is effected by means of rigid stay bolts or ties uniting the two chains and having the rolls mounted to turn freely thereon.

The supporting-frame for the chains is indicated by $h$, the same having an enlarged base, through which bolts $u$ pass to secure it to the floor. The lateral sides $h'$ of the frame are practically semicircular in form and extend somewhat beyond the edge of the pulley $p$ on each side. (See Figs. 1, 3, &c.)

In order to simplify and cheapen the cost, I prefer to cast the two sides $h'$ in separate pieces and secure them to the body portion of the frame by bolts $h^2$. To the inner face of each side, and contiguous to the edge of the pulley $p$, is secured a semicircular guide-flange $t$. The flange is separated from the side along the lower edge by stay-bolts $m$, on which small rolls $i$ are loosely mounted. The length of these rolls, which also is nearly equal to the distance between the adjacent faces of the side $h'$ and flange $t$, is practically equal to the thickness of the chain $a$. In the drawings the locations of the rolls $i$, &c., are such that the general surface of the upper or outer edge of the chain, when mounted in the frame $h$ and supported by said rolls, is substantially flush with the face of the pulley.

In order to further guide the chain, &c., when in use, I provide the inner faces of the sides $h'$ with a semicircular concentric groove $o$, well rounded or flaring at the entrance. These grooves are so located with reference to the rolls $r$ that the journals $r'$, which extend sufficiently through the links for the purpose, pass freely therein.

As it is desirable in most cases that the length of the apron or chain $a$ exceeds the circumference of the belt-pulley $p$, I provide a standard $e$, (or other equivalent means,) in which is mounted a short shaft $c$, carrying sprocket-wheels $d$, arranged to properly engage the chain-links. Now, it will be seen that upon turning the shaft $c$ in the arrow-direction, Fig. 1, the endless apron will be carried ahead and round the supporting-frame until the first belt-roll $r$ comes in contact with the under side of the oppositely-traveling belt $b$. At the same time, if the belt be properly slackened, the advancing roll $r$ gradually lifts the belt from the pulley, the journals $r'$ thereof entering the guide-grooves $o$. The continuation of the apron's movement causes the other rolls $r$ (extending over a length of the chain equal to one-half or more of the pulley's periphery) to successively engage the belt and lift it radially from the pulley, as clearly shown by Figs. 2 and 4. The apron may now remain stationary as long as desired, the pulley $p$ meanwhile revolving as usual, but entirely free from the belt. In order to cause the belt to re-engage the pulley, the apron is simply carried in the opposite direction, thereby permitting the belt to gradually encounter the pulley, at the same time tightening the belt until the device is returned to its normal position. (Shown in Fig. 1.) Instead of thus reversing the movement of the apron, it may be continuously advanced in the forward direction until it again resumes the said normal position.

In Sheet 2 of the drawings I have represented my improved belt-shifter as arranged and adapted to control a dynamo-machine belt. In this case D indicates the dynamo as a whole, mounted to slide on a base-frame $f$, as common to machines of this class.

In the drawings, Fig. 9, $k$ designates a screw mounted to revolve freely in the frame $f$, and provided with fast collars $c^4$, thereby preventing endwise movement of the screw, $f^2$ being a nut for the screw. It will be seen now that by revolving the screw by suitable means in the proper direction the dynamo will be advanced, say, nearer to the driving-shaft $s$, a reverse movement obviously forcing the dynamo in the opposite direction, assuming of course that the said nut is secured to the dynamo.

In order to provide the belt-shifter with means for actuating the roll-carrying apron, the shaft $c$ of the standard $e$ is extended and provided, say, with a worm-wheel $t$, secured thereto, which is adapted to be operated by a worm $t'$, secured to a suitably-mounted shaft $g$. In the drawings this shaft is represented as extending to the front end of the dynamo and having a hand-wheel $n^3$ secured thereto for revolving the worm as desired. By the addition of a chain-wheel $v^4$ to the shaft $g$, a similar wheel $v$ being mounted upon the threaded shaft $k$ and a connecting band or chain belt $v'$, the motion of the last-named shaft may be transmitted to the worm-shaft.

$k'$ indicates a lever for revolving the screw-shaft. This lever may be constructed and arranged to operate as a ratchet-lever, $v^3$ being a ratchet-wheel secured to the shaft $k$. By means of clutch-teeth formed on the opposite side of the lever $k'$ and engaging a similar clutch formed on the loosely-mounted chain-wheel $v$ the lever $k'$ may be employed for revolving the worm-shaft and consequently the endless apron $a$. The outer end of the chain-wheel $v$ may be connected with a shipper-lever $n^2$. By moving the latter lever in the arrow direction Fig. 9, the wheel $v$ and lever $k'$ are locked together. An interposed spring $v^2$ serves to maintain the parts in a disconnected position upon the removal of pressure from the shipper-lever.

I would state that I prefer to make the pitch of the screw $k$ and the proportions of the wheels $v$ and $v^4$, the worm and wheel $t$, &c., such that the forward travel of the apron $a$ will bear a close relation to the amount of rearward movement of the dynamo, so that the first roll $r$ engages the correspondingly-slackening belt $b$ and lifts it radially from the pulley $p$ at that point, the continued travel of the apron taking up the belt substantially as fast as it is slackened until the complete removal of the belt from the pulley is effected, or as indicated by Figs. 2, 4, and 8.

It is obvious that other means may be employed for revolving the sprocket-carrying shaft $c$, as well as for effecting the movement of the dynamo, without departing from the spirit of my invention. It is also evident that the dynamo may be located on a floor above the pulley $p$, the main belt $b$ and shaft $g$ leading from the dynamos then being at an angle or inclined to the pulley.

Having thus described my invention, what I claim as new, and desire to secure by Letters Patent, is—

1. A device for shifting driving-belts from continuously-revolving pulleys, the same having a mounted and operating endless flexible connection or double chain belt exceeding the width of the belt to be shifted, and having a portion of the length of the chain belt provided with transversely-mounted rolls $r$, adapted in operation to successively engage the driving-belt and lift it radially from the pulley, substantially as hereinbefore described.

2. The combination, with a pulley $p$, rigidly secured to the shaft, and the driving-belt leading from the pulley, of the mounted and operative endless flexible connection or apron hereinbefore described, consisting of two side portions separated laterally by a distance exceeding the width of the said driving-belt and provided with loose transverse rolls mounted in and connecting the two side portions of the apron, and adapted in use to successively engage the under side of the driving-belt and lift it radially from the pulley, substantially as specified.

3. The combination, with a pulley $p$ and belt $b$, of the endless flexible apron, stationary guides at each edge of said pulley to receive the apron, a series of interposed transverse rolls $r$, mounted in and uniting the sides of the apron, wheels mounted at the front side of the driving-pulley adapted to support and operate the apron, and mechanism for revolving said wheels, substantially as hereinbefore described.

4. The combination, with a shaft mounted to revolve, a driving-pulley secured thereto, and a driving-belt adapted to said pulley, of a mounted endless flexible apron having a portion of its length provided with a series of transversely-arranged rolls $r$, mounted in and extending above the general surface of the apron, and mechanism for actuating the apron around said pulley, whereby in operating the apron the said rolls engage the driving-belt and lift it radially from the pulley, substantially as hereinbefore described.

5. The combination, with a driving-pulley $p$, belt $b$, standard $h$, provided with concentric guides, and a suitably-mounted and actuated sprocket-wheel-carrying shaft $c$, of the endless flexible apron $a$, mounted on and supported by said guides and sprocket-wheels, and a series of belt-supporting rolls mounted in and carried by said apron, substantially as hereinbefore described, and for the purpose set forth.

6. The combination, with a driving-pulley and its belt and an endless flexible apron, consisting of two side chains provided with a series of rolls $r$, mounted to revolve therein, of the apron supporting and actuating mechanism located at the front side of the said driving-pulley, and a standard $h$, located at the opposite side of the pulley, provided with two sides or lateral extensions $h'$, having each a concentric guide arranged to receive and support the said side chains of the apron, substantially as shown and described.

7. The combination, with a driving-pulley and a driven pulley and a belt connected therewith, of an endless-belt-shifting apron, constructed substantially as hereinbefore described, a stationary guide arranged at each edge of said driving-pulley to receive and support the apron, a mounted shaft provided with wheels for supporting the apron, located between said pulleys and arranged intermediate of the upper and lower sides of the driving-belt, belt-slackening mechanism, and mechanism for turning the said shaft and wheels to actuate the belt-shifting apron, substantially as described.

In testimony whereof I have affixed my signature in presence of two witnesses.

GEO. H. REMINGTON.

Witnesses:
CHARLES HANNIGAN,
WILLARD LEE WELLMAN.